Nov. 2, 1926.
R. J. B. SMITH
1,605,623
COMBINATION TURKISH BATH AND SHAMPOO TRAY
Filed June 22, 1925
5 Sheets-Sheet 1

Inventor
Rose J. B. Smith
By Robb & Robb Hell
Attorneys

Nov. 2, 1926.    1,605,623
R. J. B. SMITH
COMBINATION TURKISH BATH AND SHAMPOO TRAY
Filed June 22, 1925    5 Sheets-Sheet 2
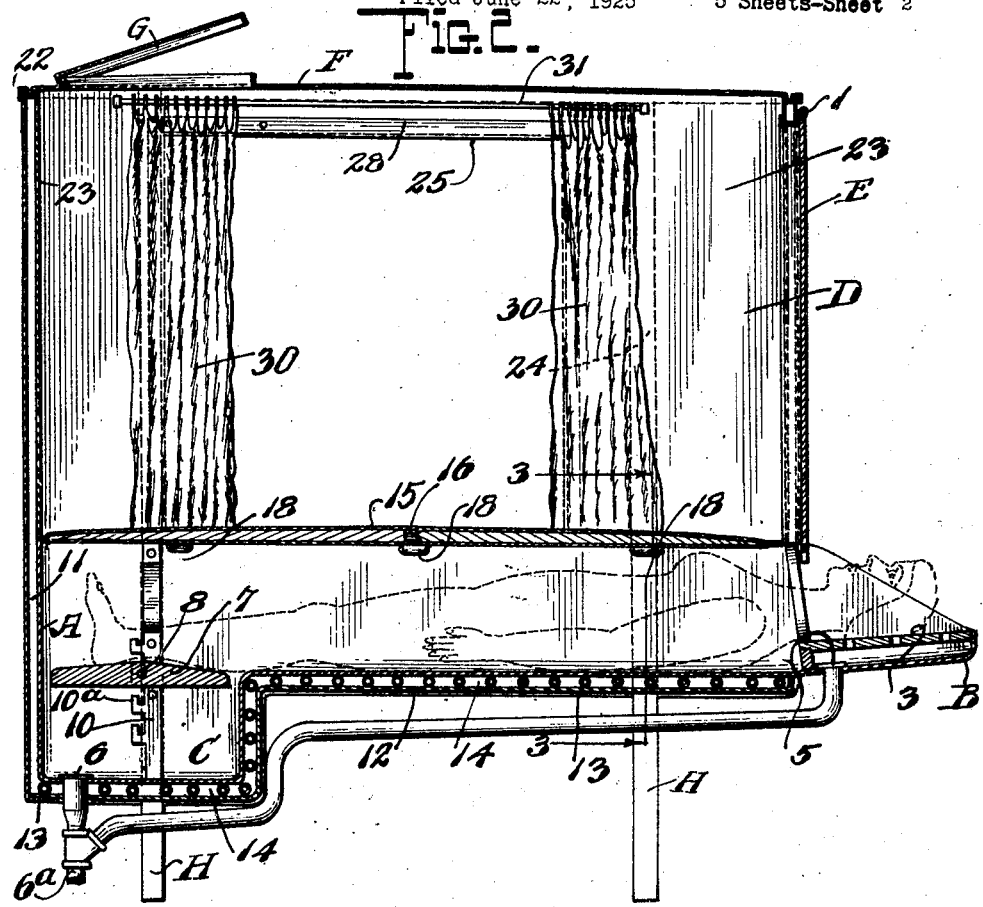
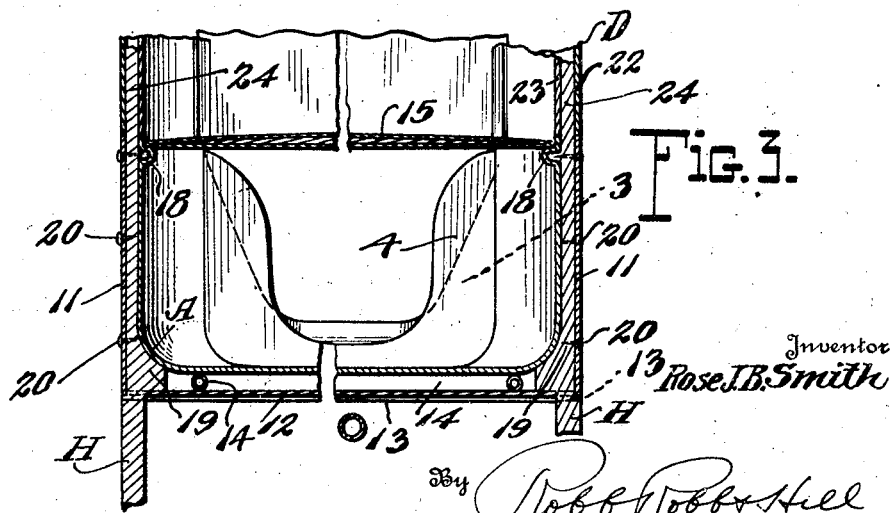

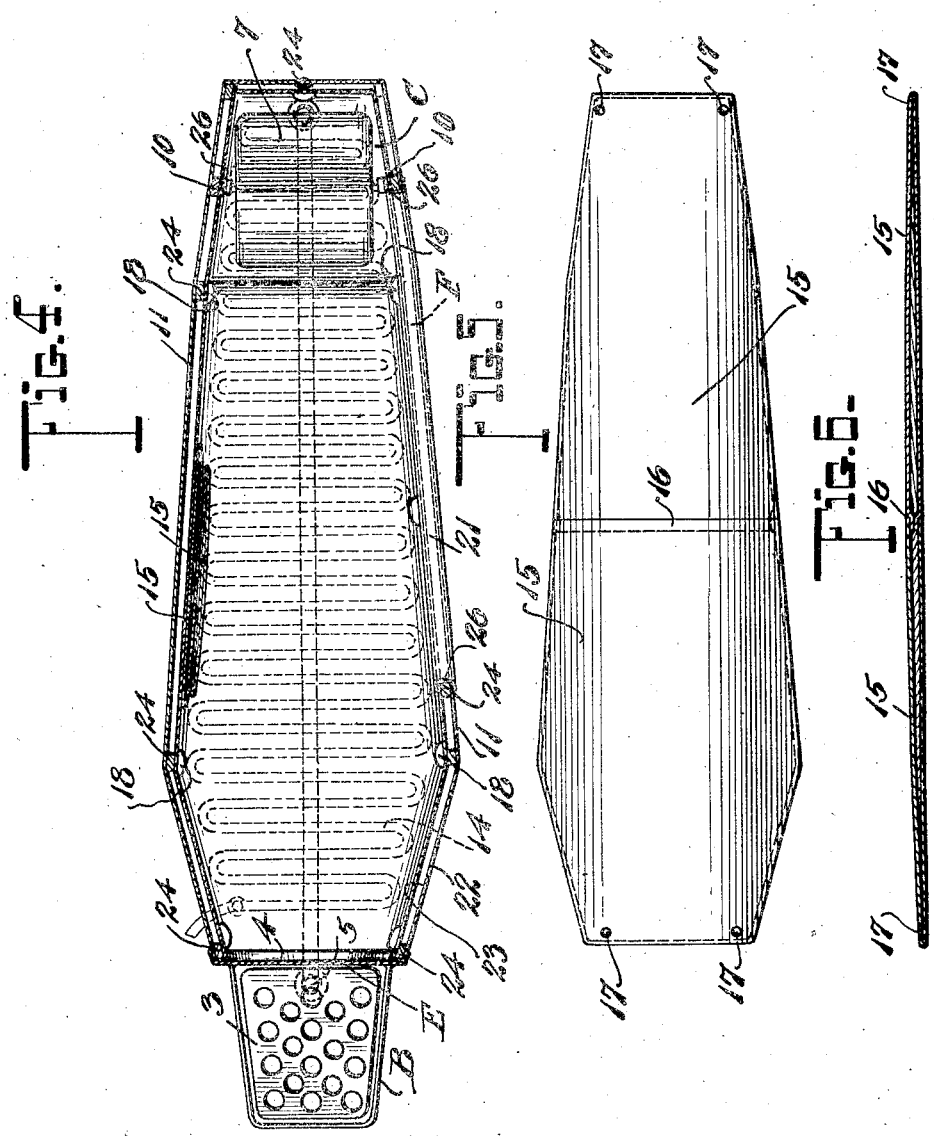

Nov. 2, 1926.                                               1,605,623
R. J. B. SMITH
COMBINATION TURKISH BATH AND SHAMPOO TRAY
Filed June 22, 1925        5 Sheets-Sheet 4
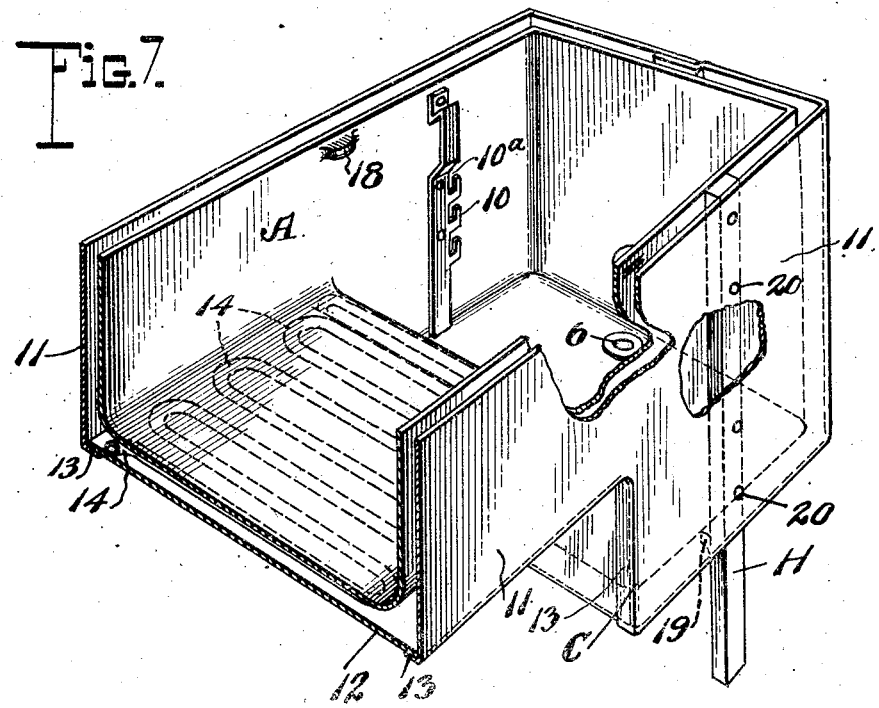
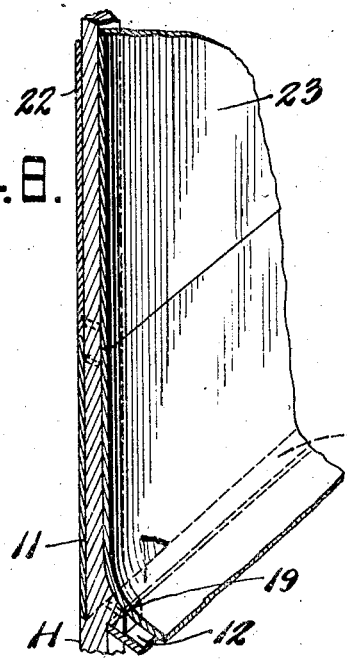
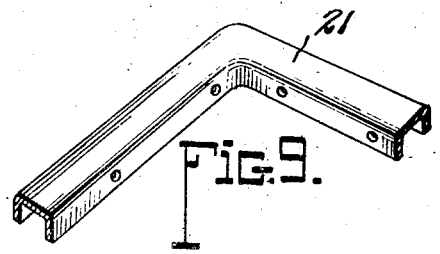
Inventor
Rose J. B. Smith
By Robb, Robb & Hill
Attorneys Nov. 2, 1926.  
R. J. B. SMITH  
1,605,623  
COMBINATION TURKISH BATH AND SHAMPOO TRAY  
Filed June 22, 1925  5 Sheets-Sheet 5
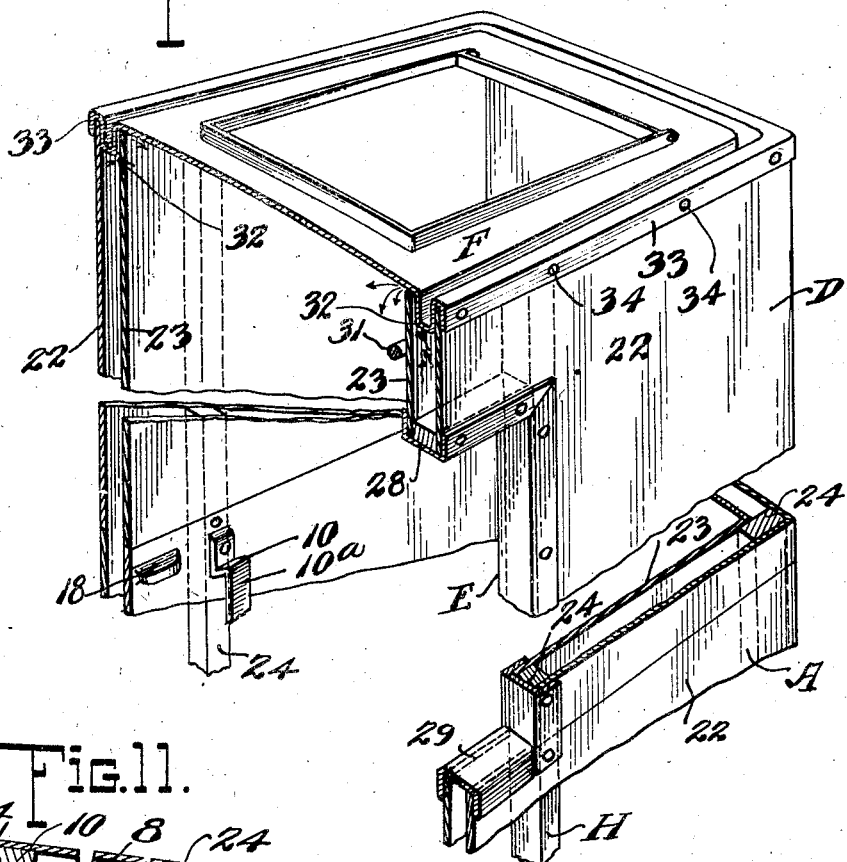
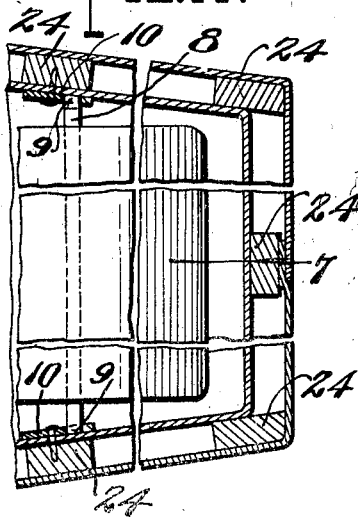
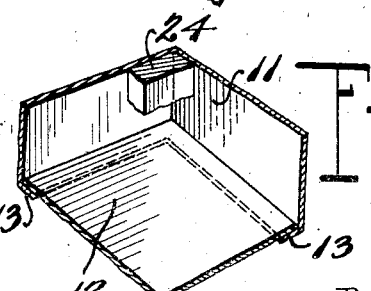
Inventor  
Rose J. B. Smith
By Robt Robbs Hill  
Attorneys Patented Nov. 2, 1926.

1,605,623

UNITED STATES PATENT OFFICE.

ROSE J. B. SMITH, OF SHAKER HEIGHTS, OHIO.

COMBINATION TURKISH BATH AND SHAMPOO TRAY.

Application filed June 22, 1925. Serial No. 38,823.

The primary object of this invention has been to design a handy, compact and efficient apparatus comprising essentially a body tray, a head or shampoo tray and a shower stall or canopy constructed and supported so as to offer special facilities for the purpose of giving cleansing or curative baths or treatments of various kinds.

In the carrying out of the invention, heat for the purpose of inducing eliminations from the body is provided by employing any suitable heating means in conjunction with the body tray and canopy carried thereby, or the body tray alone, the heat being radiated by the inner walls and bottom or floor of the body tray, and the inner walls of the canopy or stall, said walls being insulated preferably from outer walls provided therefor by the provision of an intermediate air space between said walls.

The apparatus of the invention is preferably of a portable nature and the body tray may be used with or without the canopy or stall section which is ordinarily provided above said tray. In order to facilitate the giving of treatments by the operator, and for the ease and convenience of the operator, it is contemplated that the body tray and canopy shall be supported in an elevated position, the canopy or stall being provided with a side opening through which access to the body of the person being treated may be had, and said opening adapted to be closed by a suitable curtain when hosing or spraying operations are being carried on. The canopy or stall section of the apparatus may be dispensed with if the body tray is located in a tile compartment that offers a suitable substitute for said section. The primary purpose of the canopy is to enable the person being treated to stand upright when his body is being sprayed or hosed, at which time the head of the person may pass through an opening in the top of the canopy normally closed by a suitable door or cover.

In the practical embodiment of the invention, the general outline of the body tray conforms with that of the human figure for purposes of convenience, utility, and economy, the head section of the apparatus being in the form of an open tray so that the head and face of the person operated upon or treated is exposed whilst his body is maintained covered or enclosed within the body tray structure.

The invention involves constructional features including a special form of footrest, a special form of body tray cover, suitable provisions for bracing and supporting the canopy, certain leg supporting devices, and other specific features, the details of form of which, and the manner of use of which will become apparent upon reference to the following detailed description, in conjunction with the accompanying drawings, in which:

Figure 2 is a vertical longitudinal sectional view taken about on the line 2—2 of Figure 1.

Figure 3 is a fragmentary vertical sectional view taken about on the line 3—3 of Figure 2.

Figure 4 is a horizontal sectional view taken through the apparatus just above the body tray, dotted lines illustrating the heating pipes beneath the body tray and the shampoo slab and the foot support being shown in proper positions; also the sections of the cover for the body tray are shown as when suspended from one side of the canopy when out of use.

Figure 5 is a top plan view of the sectional cover for the body tray.

Figure 6 is a longitudinal sectional view of said body cover.

Figure 7 is a fragmentary perspective view showing primarily the foot end of the body tray and illustrating the well in which the person treated may stand when being sprayed or hosed; also showing the shell spaced from and enclosing the body tray to provide a heating space between said parts.

Figure 8 is a sectional perspective view of a fragmentary nature showing the double wall construction of the canopy and the arrangement of the body tray and shell structures relative thereto.

Figure 9 is a fragmentary perspective view of the finishing member which may be provided for the upper edges of the body tray and shell and at openings therein if desired.

Figure 10 is a sectional perspective view bringing out more fully the wall construction of the canopy or stall section and the mounting of the top or detachable cover member mounted on said canopy.

Figure 11 is a horizontal section view taken through the foot portion of the body tray.

Figure 12 is a fragmentary sectional view showing the manner of supporting of the bottom of the shell which is spaced from the bottom of the body tray.

Figure 1:
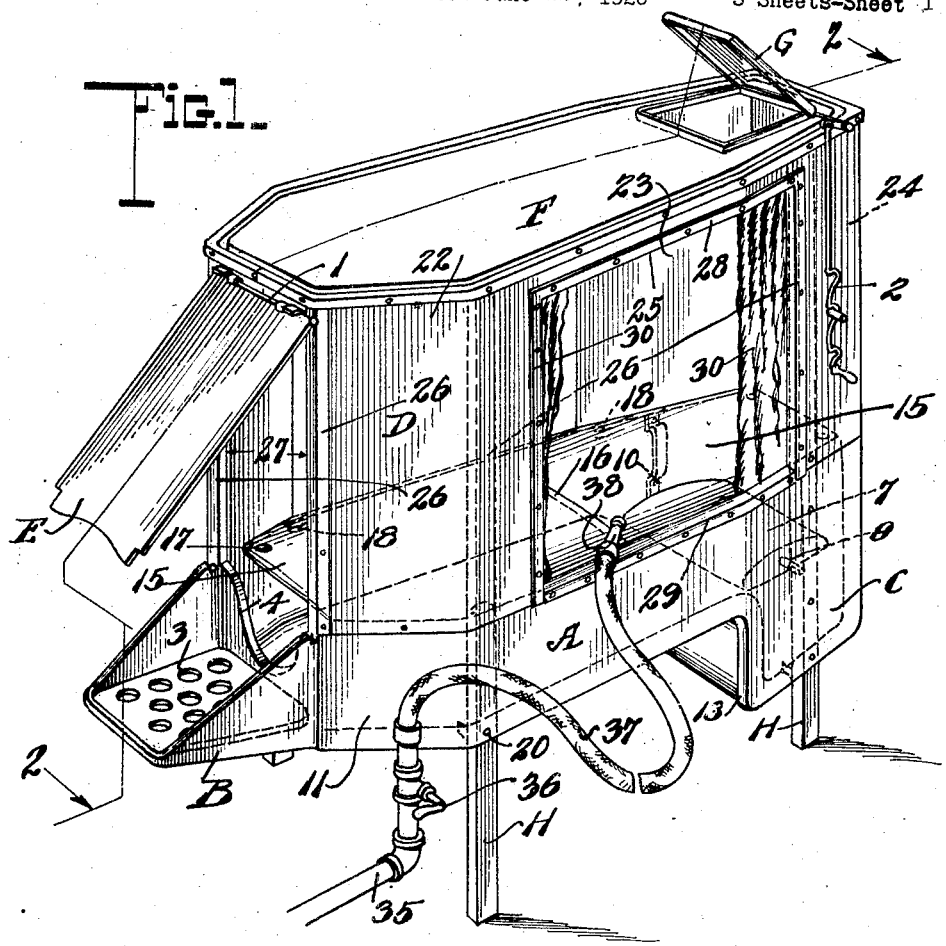
Figure 1 is a perspective view of an apparatus embodying the invention, the curtains at the side opening of the canopy being drawn back, the door at the head of the canopy being shown open and the water supply connection for supplying or hydrating the body of the person being treated, being indicated as when available for use.
Figure 13:
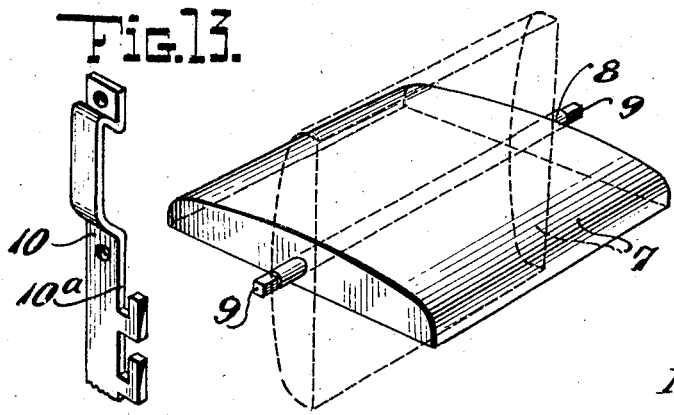
Figure 13 is a fragmentary perspective view of the supporting member for adjustably supporting the foot-rest.
Figure 14:
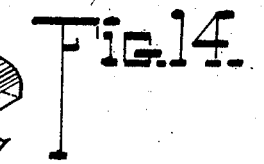
Figure 14 is a similar view of the foot-rest itself, dotted lines showing the manner in which the rest may be adjusted pivotally upon its axis member.

A general description of the apparatus will first be given after which certain details will be definitely set forth.

In the drawings A generally designates the body tray feature of the apparatus, the same equipped with the head section or tray B at one end and provided at its opposite end with the well or depression C. The canopy or stall supported on the tray A is designated D, and is equipped with a door E at the head end of the apparatus swingingly or otherwise supported, or removable from a supporting means designated 1.

The canopy or stall D is provided at its top with a top closure or cover F having the door G adapted to be opened by any suitable means, the hand rod 2 for this purpose being merely illustrative and a convenient appliance to this end. It will be seen that the side walls of the head section B of the apparatus taper downwardly toward the head extremity of the tray forming said section, and arranged in this tray is a shampoo slab 3 which may or may not be apertured to facilitate the passing off of water from the shampoo tray into the body tray A from which said water may drain through a drain opening 5 near the body end of the head tray, and thence to connection 6ª for drain opening 6 provided in the well or depression C of said tray.

It will be apparent that the apparatus is supported by means of a series of legs H and the shampoo tray or head section B is separated from the body tray A by a notched partition 4, the notch in said partition conforming with the neck of the person in an obvious manner.

Arranged in the well or depression C at the foot of the body tray is the foot-rest 7 which is supported by a pintle rod 8, said rod having squared ends 9 which are adapted to fit in any pair of L-shaped slots of opposite supporting members 10 that are attached to opposite sides of the body tray at the well or depression C thereof. The supporting members 10 have the slots thereof designated 10ª and a suitable series of these slots are provided in each member 10 so as to permit of vertical adjustment of the pintle rod 8 therein to thereby carry the elevation of the foot-rest 7. The foot-rest, furthermore, is adapted to pivot on the pintle rod 8 so that it may assume different positions for the ease and convenient supporting of the feet of the person being treated in the apparatus.

Under the foregoing conditions when a person is being treated in the body tray A, he may readily recline somewhat as illustrated by dotted lines in Figure 2, his head resting upon the shampoo slab 3, his neck at the notched portion of the wall or partition 4 and his body supported by the main bottom portion of the tray with his feet upon the foot-rest 7.

As will be observed upon reference to Figures 2, 3, and 7, the body tray A is enclosed by means of a shell 11 having side walls spaced from the sides of the tray and provided with a bottom 12 which is preferably supported by the side walls of the shell 11 by means of flanges 13 projecting inwardly from the latter. If desired the bottom 12 of the shell 11 may be made in sections in order to facilitate its removal or otherwise constructed for the convenient handling of the same. Between the bottom 12 of the shell 11 and the bottom of the body tray A proper will be disposed a suitable heating unit which under some conditions may be a section of a heating pipe through which steam, hot water, or any similar heating medium may be passed. This pipe is designated at 14 and is seen best in Figures 2 and 4. It is noted, however that if desired an electric heating unit may be situated in the space beneath the body tray in lieu of the heating pipe unit 14 for the purposes of the invention.

There is provided for the body tray a cover or top which is seen in position in Figure 2 and is made in sections as illustrated in Figures 5 and 6. This top designated 15 conforms in shape with the general shape of the body tray from the neck partition 4 to the foot extremity thereof so that the said top or cover 15 may be readily used to practically close the upper portion of the tray above the body of the person reclining therein. The top or cover 15 is made in two sections with overlapping edges as shown at 16 and each having end apertures 17. The purpose of the apertures 17 is to permit the cover sections to be readily removed as separate units and if desired they may be placed out of the way inside of the canopy D by being hung from hooks projecting outwardly from the wall of the canopy opposite the open side or wall thereof. The sectional formation of the cover 15 is simply to facilitate the handling of the parts thereof which would be difficult to manage if in a single piece. This cover 15 may be made of any comparatively light material or if desired a sheet metal construction thereof may be employed, this being immaterial to the invention because I do not wish to be limited to any particular kind of material.

The cover or top 15 will be supported when in place as in Figure 2 by means of lugs 18 which project from the upper portions of the sides of the body tray near the inner upper edges of the latter. These lugs if used will be rounded so that there will be no danger of injury to the person using the apparatus, and in lieu of the lugs continuous flanges on the side and foot walls of the tray A may be availed of, being substantially equivalent in function.

As seen best in Figure 3, the legs H by which the apparatus is supported extend upwardly and are provided with lateral shoulders 19 to fit against and support the tray A, said legs at their upper ends forming spacing means for the walls of the tray A and the shell 11, the latter being preferably fastened to the legs by any suitable fastenings 20 found desirable to employ. The bottom 12 of the shell 11 will be notched out at the points where the legs come in a manner which will be quite evident.

I wish it to be understood, however, that I am not necessarily limited to the exact method of supporting the tray A and shell 11 in conjunction with the legs H as is described herein and depicted herewith, for various mechanical expedients may be resorted to in order to assemble the said structures in a substantial and effective manner. Upper ends of the legs H form spacing strips between the shell 11 and tray A, in addition to their supporting function and this is seen quite clearly in Figure 8.

The upper edge portions of the shell 11 and the body tray A are bent toward one another as shown in Figure 7, and if the canopy D is not used, I contemplate the provision of a finishing channel strip 21 of U-form in cross-section, which strip will fit over the upper edges of the parts 11 and A and may be attached thereto by fastening means passing through the sides of the channel finishing strips and through the upper edge portions 11 and A aforesaid.

Where the canopy D is used as a part of the apparatus, it is contemplated that said canopy shall comprise spaced walls 22 and 23, shown best perhaps in Figure 3, between which walls will be provided vertical and reinforcing spacing strips 24 functioning somewhat the same way as the upper ends of the legs which are received between the shell 11 and the tray A. These spacers or spacing strips 24 are preferably located at intervals along the sides and ends of the canopy and about seven or more of them may be employed, two at opposite sides of the opening at one side of the canopy, two of them at opposite sides of the opening at the head of the canopy at which the door E is located, two of them at the rear side of the canopy opposite that having the opening 25, and one at the foot end of the canopy if desired. These spacers 24 project down into the space between the tray A and shell 11, and effectively reinforce the walls of the canopy and furthermore, space apart these walls and the walls of the tray and shell so as to provide therebetween a heating chamber. In cooperation with the spacers 24 there may be used U-shaped finishing channel strips 26 at opposite sides of the opening 25 and opposite sides of opening 27 which is closed by the door E. These finishing channel strips embrace the edges of the openings and may be fastened to the spaced walls 22 and 23 of the canopy by fastenings which pass through the strips 26, the said walls 22 and 23, and the spacers or members 24 between the said walls.

A similar finishing channel strip 28 may be located at the top of the opening 25 through which the operator has access to the patient or the person treated, and a strip 29 disposed at the bottom of said opening 25.

The curtains which are used to close the opening 25 are designated 30 and are carried by a rod 31 which is located above the opening 25 and supported suitably on the inner wall of the canopy D in which said opening is formed.

The canopy D has the cover or top F previously referred to and this cover or top may be made of light metal or of any light material not having a tendency to warp or become misshapen due to the effects of water and heat thereupon. Preferably the top is constructed as shown in Figure 10 with projections or ribs 32 adapted to engage between the walls 22 and 23 of the canopy, there being flanges 33 at the outer side of said projections 32 to overlie the upper edges of the wall 22 and to receive fastening means 34 if the latter are provided. Or the top F may be maintained in position on the canopy by its weight so as to be quickly removed therefrom in an evident manner. The inner portions of the projections or ribs 32 are spaced from the inner walls 23 so that the heat passing upwardly in the space between the walls 22 and 23 may enter the main body chamber of the canopy D.

In the drawings the spaces between the wall parts are somewhat exaggerated in size for purposes of clear illustration more particularly.

The means for supplying the water for hosing or spraying the person treated is designated 35 as the water supply pipe provided with a suitable valve 36 and from which pipe leads the hose 37 having the nozzle 38.

With the apparatus constructed substantially in accordance with the foregoing description, the shampoo slab 3 may be arranged so that it rests flat or is slightly inclined toward the body tray A, and the patient may recline in a perfectly normal flat-on-the-back position in the tray A as previously suggested, with considerable comfort. The limbs of the patient may be flexed so that the feet rest on the floor of the tray A, or said feet may be elevated above the bottom of the tray or level therewith, dependent upon the adjustment of the foot-rest in the manner previously suggested. The combined body tray A and canopy D provide an improved stall or compartment apparatus to facilitate the giving of a cleansing process preliminary to the use of an electric or ice bath, and for applying dry or moist heat. Moreover, the time necessary for these operations can be advantageously availed of by manipulating the head or shampooing the hair with great ease and efficiency.

Following any of the above processes or operation, without change or exposure or inconvenience to the patient, a medicinal or any other application requiring the use of heat or water as accessory thereto, or a finishing hosing or spraying, may be quickly and effectively administered. The use of an apparatus such as herein described conduces not only to the perfect comfort of the patient reclining therein, but tends to induce relaxation, eliminate muscular pressure on blood vessels and nerves and thereby rests the heart, something which is highly desirable when a person is being subjected to an extraordinary amount of heat, cold or electricity.

After the person has been treated while reclining in the body tray, the foot-rest 7 may be removed and said person may stand in the well or depression C with his head projecting above the top or cover F of the canopy D and the body of the person may then be sprayed or hosed in a very easy manner and very efficiently.

If desired in the use of the apparatus, the feet or parts of the limbs may be submerged in water while the body is undergoing a semi-dry heating process and this is of tremendous advantage in certain kinds of cases requiring treatment; furthermore, there is more vigorous and uniform response in the treatment when the head is being worked with while the body elimination, and capillary distention are being stimulated and all of this is possible of attainment in the use of an apparatus such as herein especially described in my original design.

The body tray A affords a conveniently used heated slab exactly where needed should the patient become weak or faint while being hosed or sprayed in the stall or canopy D, a contingency thereby provided for especially when using curative baths.

There is no necessity for moving the patient from place to place in the use of my apparatus because the closely confined space and heated walls of the device make it quite safe to have the room in which the apparatus is located well ventilated without danger to the patient and this is of importance to the patient and operator because the treatment may be applied more efficiently and the patient will respond more readily to such treatment when pure air is available where the apparatus is being used. Through the provision of the heated walls and closely confined space of the apparatus, less steam is formed during the entire process and especially during the hosing operation, with little liability of damage to the room and compartment in which the apparatus is located, due to the formation of moisture. The head tray B is always open to the waste because the overflow therefrom passes to the connection $6^a$. The shampoo slab 3 may be of metal finished with baked enamel or may be of soft material such as cork. Of course, the foot-rest 7 may be disposed horizontally or perpendicularly or at any intermediate adjustments as required or desired, and arranged at different elevations by reason of the supporting means 10.

Having thus described my invention what I claim as new and desire to secure by Letters Patent, is:

1. In a body treatment apparatus of the class described, in combination, a body tray and heating shell enclosing the same and spaced therefrom, a canopy mounted above the said tray and shell and comprising spaced walls the space between which forms a continuation of that between the shell and body tray, and a cover for the body tray adapted to be supported upon the latter when discontinuance of use of the canopy compartment space is desired, said cover being removably mounted and adapted to be supported within the canopy when out of use.

2. In a body treatment apparatus of the class described, in combination, a body tray having a head tray in substantial alignment therewith and provided at its foot end with a well, a canopy mounted above the body tray and sufficiently high to enable a person to stand in the well and be hosed, the said canopy having a side opening some distance above the bottom of the body tray for access to the patient within the canopy but through which the water by which the person is hosed cannot escape, cover means for the body tray to cut off the compartment of the same from the main compartment of the canopy, and means on the body tray for supporting said cover when in use.

3. In a body treatment apparatus of the class described, in combination, a body tray having a head tray in substantial alignment therewith and provided at its foot end with a well, a canopy mounted above the body tray and sufficiently high to enable a person to stand in the well and be hosed, the said canopy having a side opening some distance above the bottom of the body tray for access to the patient within the canopy but through which the water by which the person is hosed cannot escape, cover means for the body tray to cut off the compartment of the same from the main compartment of the canopy, and means on the body tray for supporting said cover when in use, the said cover being made in sections so as to be readily lifted and hung up in the canopy, and the canopy having supporting means for receiving and supporting the cover sections substantially as described.

4. In a body treatment apparatus of the class described, in combination, a body tray, a head tray in substantial alignment with the body tray, and water and supply means for said parts, the body tray having a well at its foot end forming a continuation of the space of the tray and constructed so a person may stand therein.

5. In a body treatment apparatus of the class described, in combination, a body tray, a head tray in substantial alignment with the body tray, and water and heat supply means for said parts, the body tray having a well at its foot end, and a foot rest removably mounted in the well.

6. In a body treatment apparatus of the class described, in combination, a body tray, and a canopy above the body tray, said canopy having a closable side opening through which access may be had to the patient, curtain means for said side opening, and a well at the foot end of the body tray in which a person may stand upright in the canopy.

7. In a body treatment apparatus of the class described, in combination, a body tray, and a canopy above the body tray, said canopy having a closable side opening through which access may be had to the patient, curtains to close said side opening, and a well at the foot end of the body tray in which a person may stand upright in the canopy, the top of the canopy having an opening through which the head of a person standing in the well may pass.

8. In a body treatment apparatus of the class described, in combination, a body tray, and a canopy above the body tray, said canopy having a closable side opening through which access may be had to the patient, curtains to close said side opening, and a well at the foot end of the body tray in which a person may stand upright in the canopy, the top of the canopy having an opening through which the head of a person standing in the well may pass, and a removable and adjustable foot-rest over said well.

9. In a body treatment apparatus of the class described, in combination, a body tray, a shell enclosing said tray and spaced therefrom, and heating means for the space between the shell and body tray, and legs supporting the body tray and shell and cooperating to hold the said parts spaced.

10. In a body treatment apparatus of the class described, in combination, a body tray, a shell enclosing said tray and spaced therefrom, and heating means for the space between the shell and body tray, a head tray in substantial alignment with the body tray, and water and heat supply means for said parts, and a removable cover for the body tray extending thereover, and a canopy above the body tray and forming a hosing stall in which a person may stand upright in the tray.

11. In a body treatment apparatus of the class described, in combination, a body tray, a shell enclosing said tray and spaced therefrom, and heating means in the space between the shell and body tray, a head tray in substantial alignment with the body tray, and water and heat supply means for said parts, and a removable cover for the body tray extending thereover, and a canopy above the body tray and forming a hosing stall in which a person may stand upright in the tray, the canopy having a head opening, and the body tray having a foot well in vertical alignment with said opening.

12. In a body treatment apparatus of the class described, in combination, a body tray, a shell enclosing said tray and spaced therefrom and heating means for the space between the shell and body tray, and water and heat supply means for said parts, and a removable cover for the body tray extending thereover, and a canopy above the body tray and forming a hosing stall in which a person may stand upright in the tray, the canopy having a head opening, and the body tray having a foot well in vertical alignment with said opening, the cover being in sections so as to be readily removed and hung up at one side of the canopy.

In testimony whereof I affix my signature.

ROSE J. B. SMITH.